Figure 1:
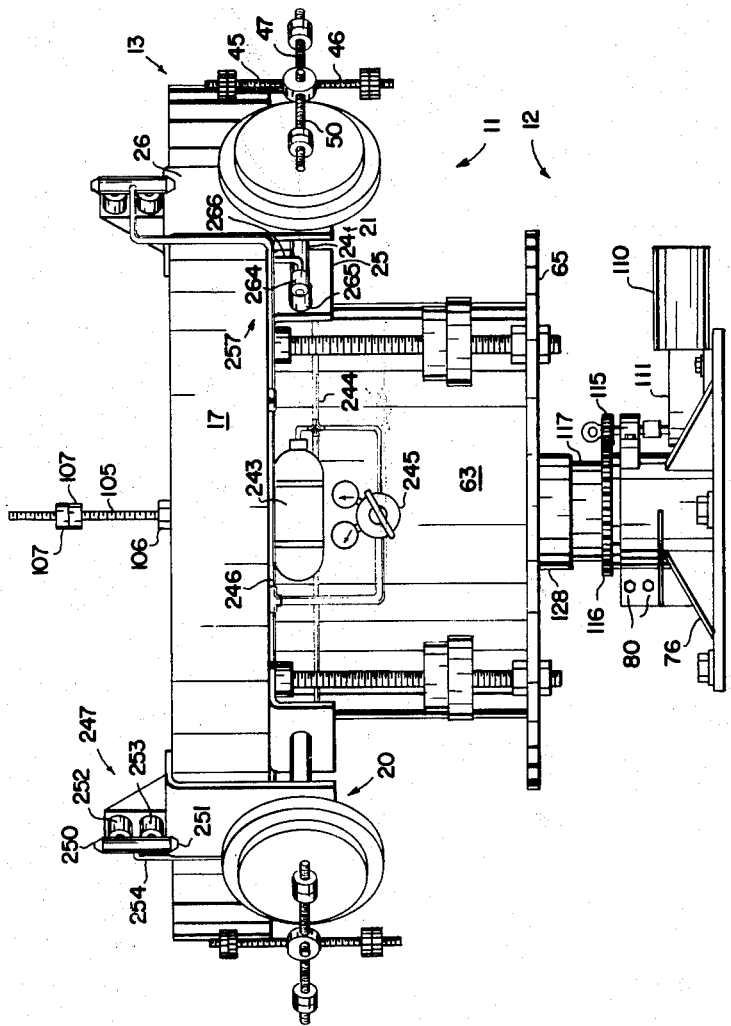

Aug. 31, 1965     L. E. ASKE     3,203,224
CONTROL APPARATUS

Filed Oct. 29, 1962     7 Sheets-Sheet 1

*INVENTOR.*
LEONARD E. ASKE
BY
*ATTORNEY*

Aug. 31, 1965  L. E. ASKE  3,203,224
CONTROL APPARATUS
Filed Oct. 29, 1962  7 Sheets-Sheet 2

INVENTOR.
LEONARD E. ASKE
BY
ATTORNEY

Aug. 31, 1965   L. E. ASKE   3,203,224
CONTROL APPARATUS
Filed Oct. 29, 1962   7 Sheets-Sheet 4

INVENTOR.
LEONARD E. ASKE
BY
ATTORNEY

Aug. 31, 1965

L. E. ASKE 3,203,224

CONTROL APPARATUS

Filed Oct. 29, 1962

7 Sheets-Sheet 5

INVENTOR.
LEONARD E. ASKE
BY
*George W Field*
ATTORNEY

INVENTOR.
LEONARD E. ASKE
ATTORNEY

United States Patent Office 3,203,224
Patented Aug. 31, 1965

3,203,224
CONTROL APPARATUS
Leonard E. Aske, Minneapolis, Minn., assignor to
Honeywell Inc., a corporation of Delaware
Filed Oct. 29, 1962, Ser. No. 233,727
6 Claims. (Cl. 73—1)

This invention relates to the field of astronautics and more particularly is directed to apparatus for simulating on the ground certain characteristics of a vehicle in space, so as to facilitate the production of attitude control systems for such vehicles by making it possible to evaluate their performance without requiring actual flight of the vehicle.

A primary object of the invention is accordingly to provide a space vehicle simulator. Other objects of the invention are to provide means usable at the earth's surface for testing attitude control systems for space vehicles in flight, to provide a testing platform having maximum rigidity and moment of inertia and minimum friction, to provide such a platform together with reaction jet means controllable by system components supported thereon without changing the static balance of the platform, and to provide an air bearing supported platform which may be placed in neutral equilibrium regardless of the weight and location of attitude control system components mounted thereon, and regardless of the attitude of the platform.

Various other objects, advantages, and features of novelty not individually enumerated above which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

Figure 2:
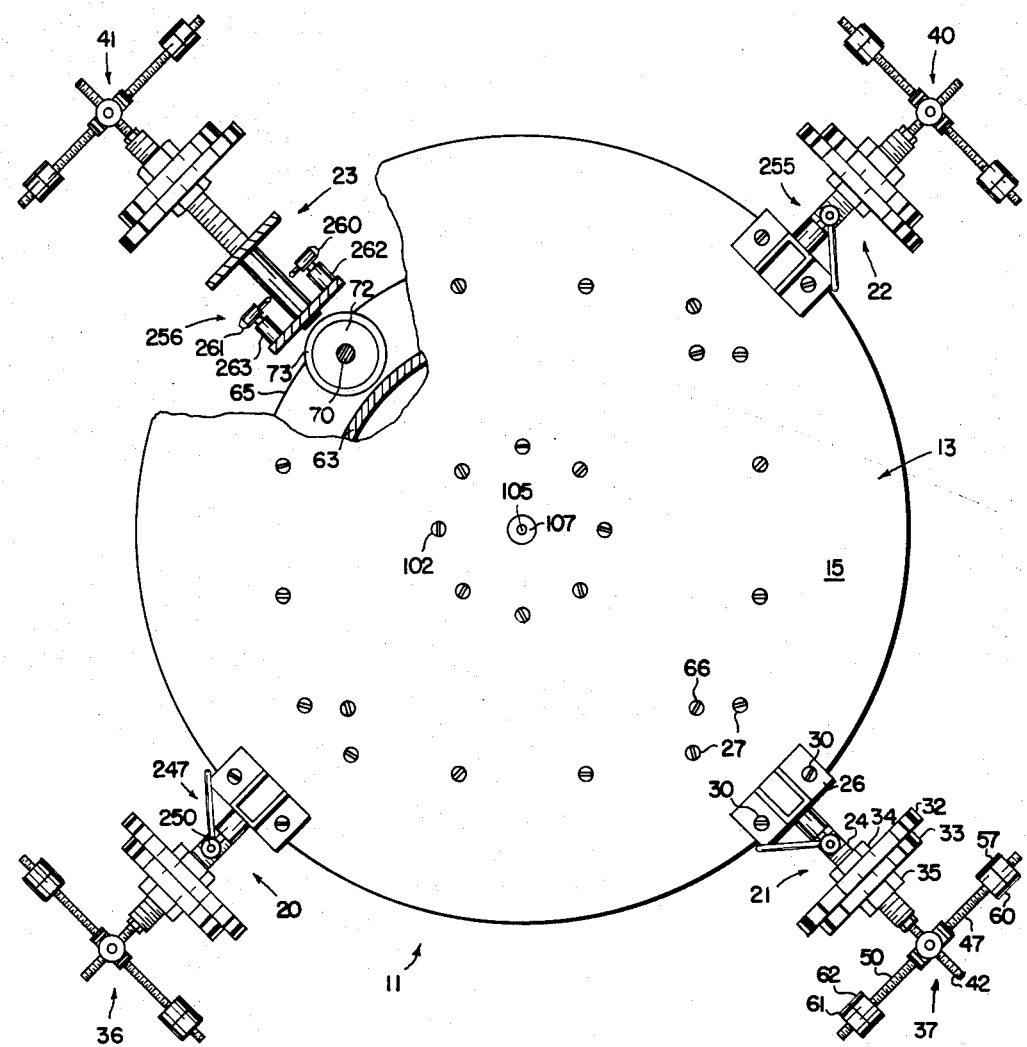
Figure 3:
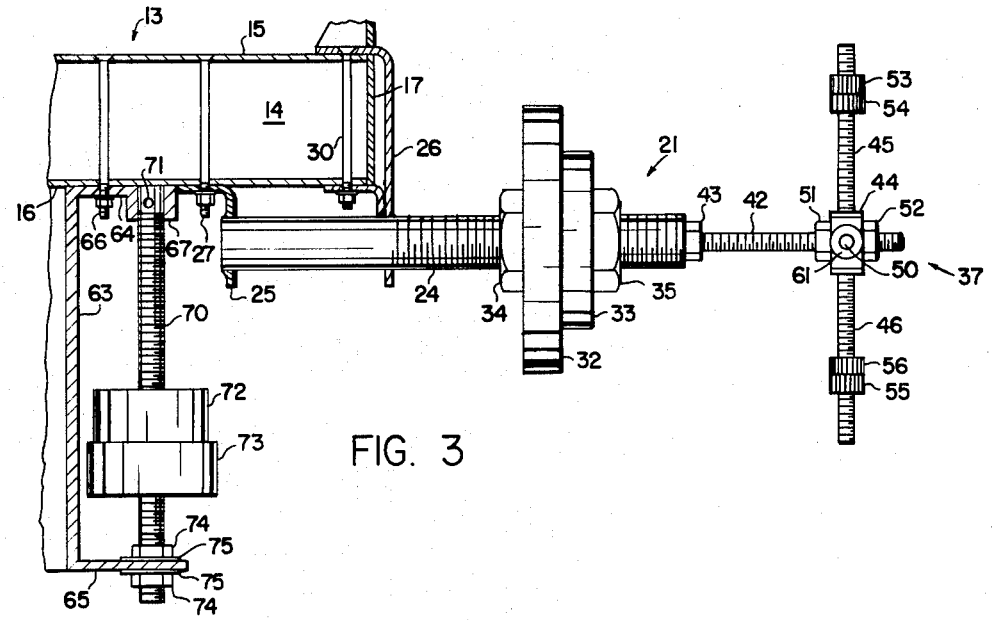
Figure 5:
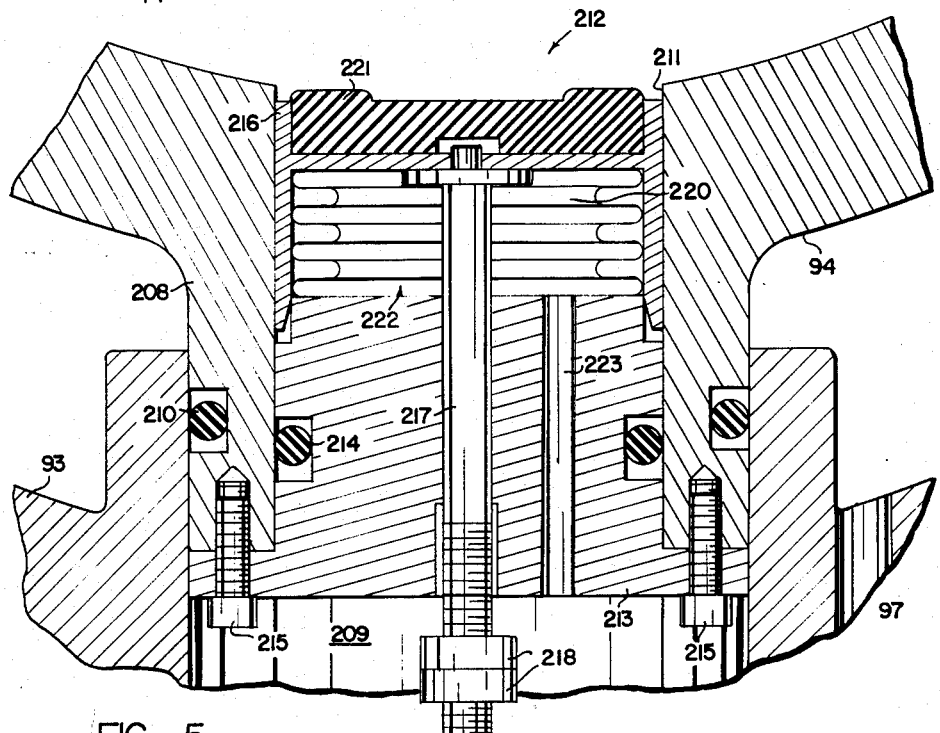
Figure 4:
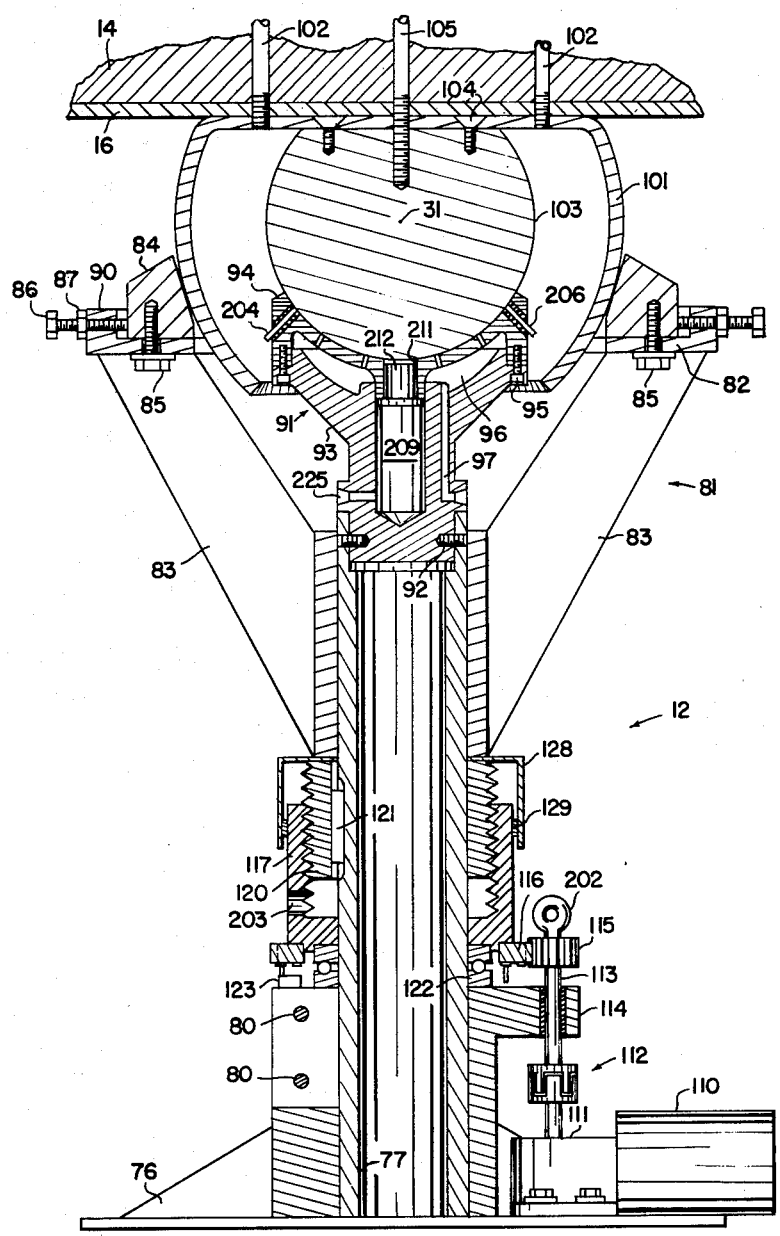
Figure 6:
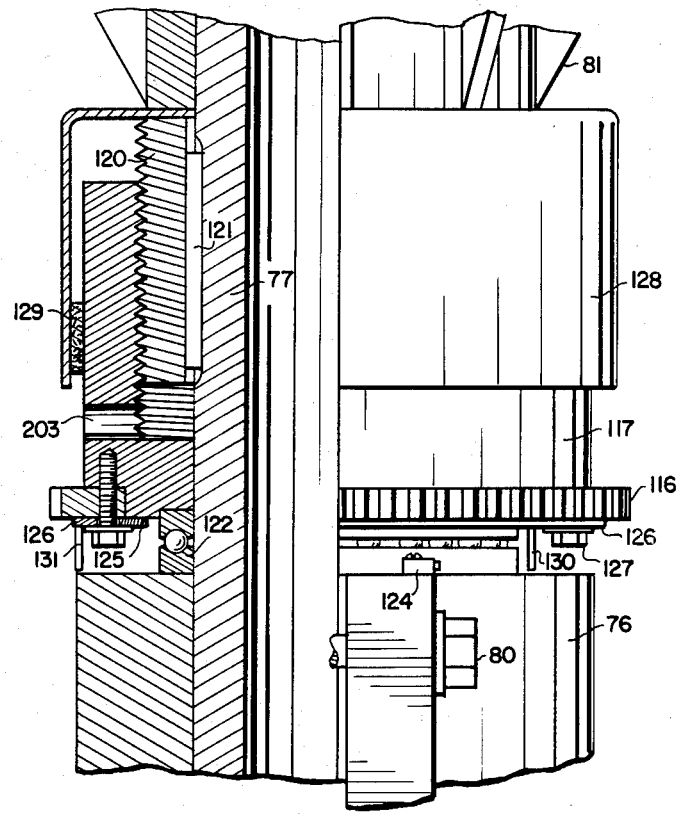
Figure 9:
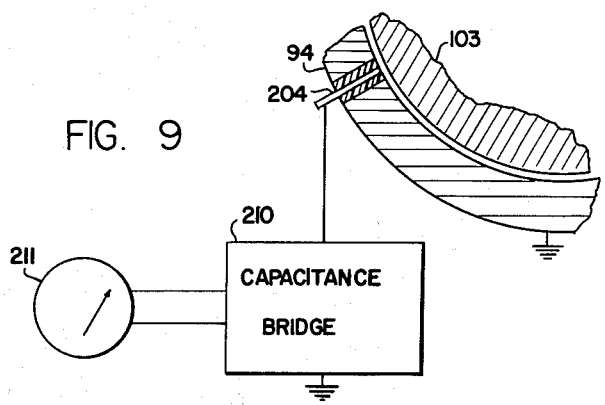
Figure 7:
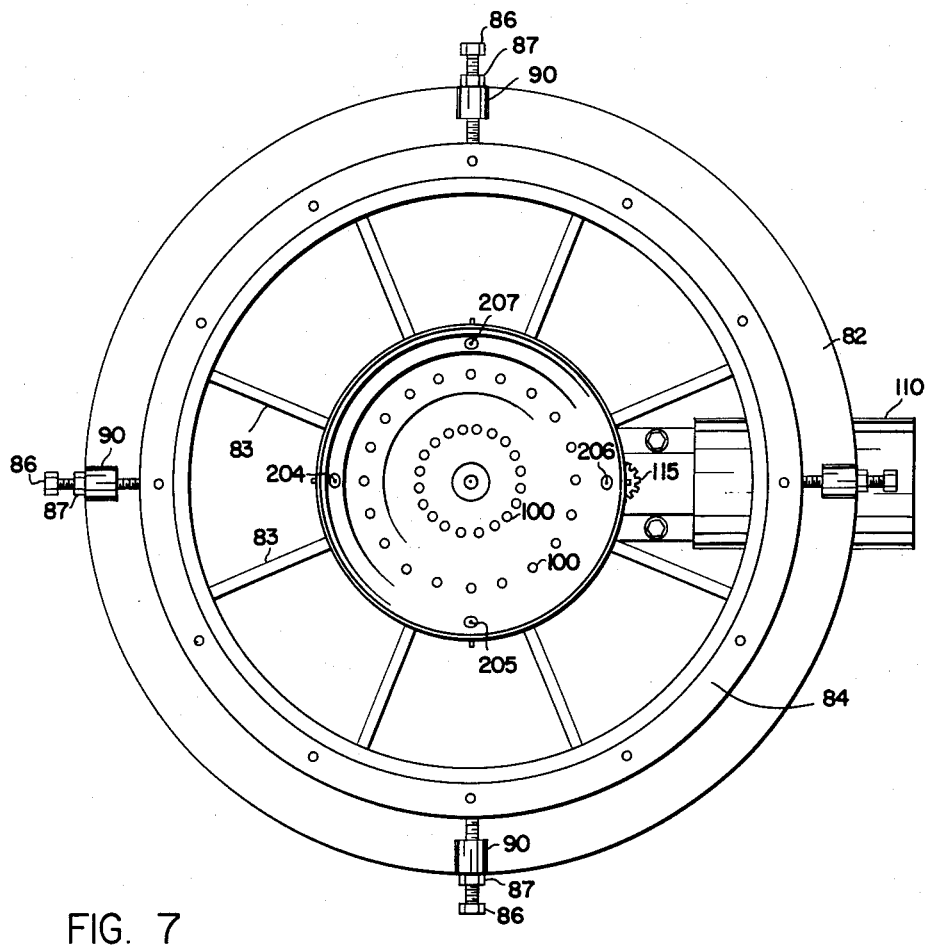
Figure 8:
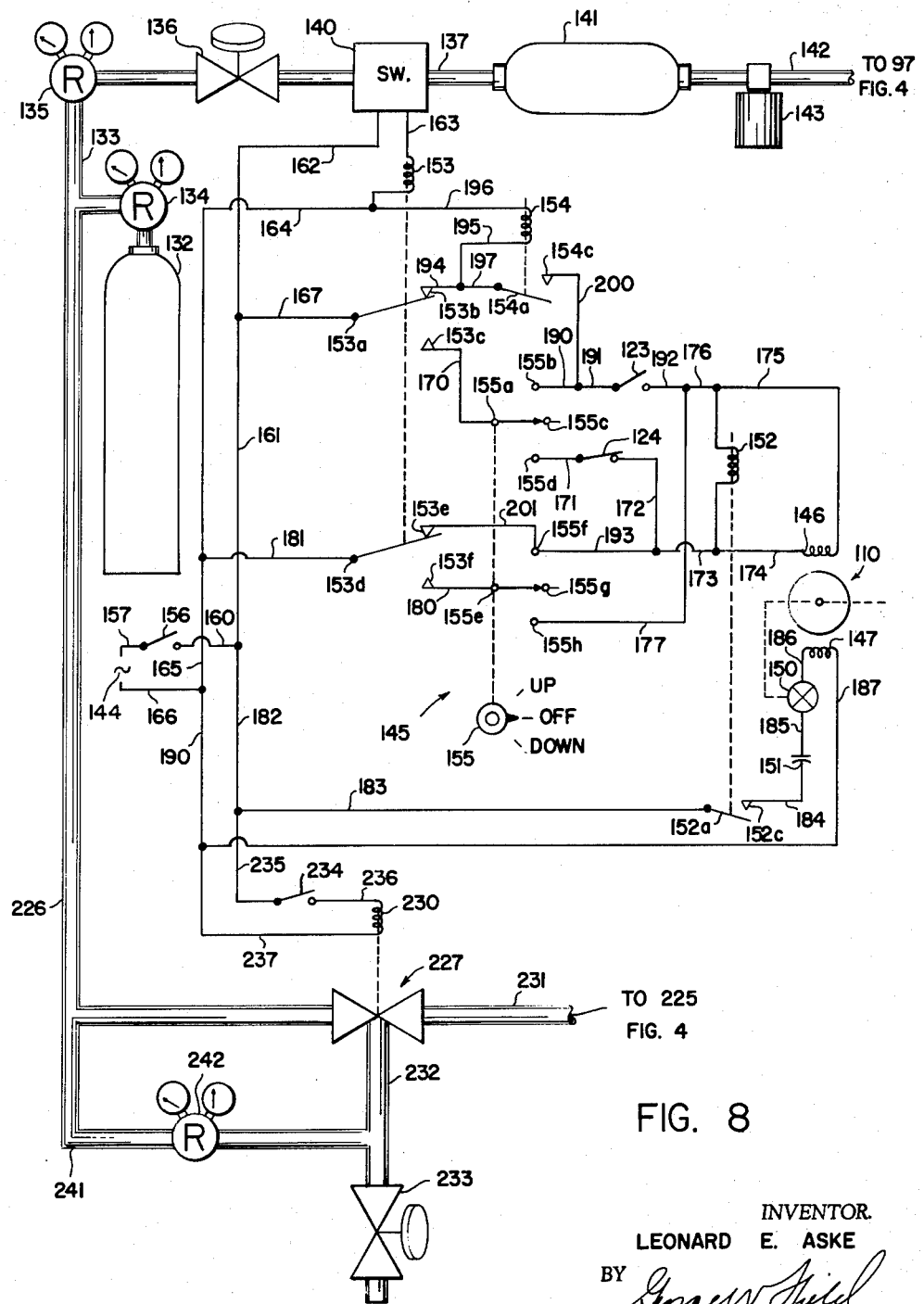

In the drawing:

FIGURE 1 is an elevation of the invention,

FIGURE 2 is a plan view of the invention, with portions broken away for clarity of illustration, FIGURES 3, 5 and 6 are fragmentary details, FIGURE 4 is a cross-sectional view of the supporting column and table bearing and support, FIGURE 7 is a plan view of the support structure with the table removed, FIGURE 8 shows the electrical and gas pressure system for the equipment, and FIGURE 9 shows a measuring circuit.

The simulator as a whole is best shown in FIGURES 1 and 2: it is made up of a platform assembly 11 and a support or base assembly 12. The major portion of assembly 11 is a platform 13 which comprises a disc of honeycomb material 14 (FIGURE 3) arranged so that the axes of the honeycomb cells are aligned with the thickness of the disc. The honeycomb material is secured to upper and lower plates 15 and 16, and is surrounded by a peripheral metal cylinder 17.

FIGURE 2 shows that inertial weight supports 20, 21, 22 and 23 are secured to platform 13 at 90° intervals therearound. Support 21 is representative and is shown in FIGURE 2 to comprise a threaded shaft 24 welded to an inner bracket 25 and an outer bracket 26 which are fastened to platform 13 by bolts 27 and 30, respectively. The threaded shafts of supports 20 and 22 are coaxial, as are the shafts of supports 21 and 23, and the two axes thus defined intersect to define a plane parallel to the surface of platform 13: the point of intersection lies on the axis of platform 13 and is identified in FIGURE 4 by the reference numeral 31. Inertial weights may be applied to the weight supports and may be positioned thereon at any desired distance from the center of the platform, to give the platform the desired moment of inertial and to balance it statically. Thus, FIGURE 3 shows a large inertial weight 32 and a small inertial weight 33 clamped on shaft 34 between nuts 34 and 35.

Fine adjustment of the balance and inertia of the platform is provided by vernier assemblies 36, 37, 40 and 41 on supports 20, 21, 22 and 23, respectively. Assembly 37 is representative and is shown to comprise a threaded shaft 42 mounted coaxially on shaft 24 by a lock nut 43, and carrying a crossbored member 44 from which project a plurality of threaded shafts 45, 46, 47 and 50. The position of member 44 along shaft 42 is adjustable by lock nuts 51 and 52: it is always arranged so that, when platform 13 is level, the axis of shafts 45 and 46 is vertical and that of shafts 47 and 50 is horizontal. Pairs of fine adjust jam nuts 53 and 54, 55 and 56, 57 and 60, and 61 are provided on shafts 45, 46, 47 and 50, all respectively.

Referring again to FIGURE 1, platform assembly 11 also comprises a counterweight member 63 in the form of a hollow cylinder, shown in FIGURE 3 as having upper and lower flanges 64 and 65. Counterweight member 63 is secured to platform 13, by adhesive bonding and by a plurality of bolts 66, so that it is coaxial with the platform. Flange 64 is provided with bosses at points around its periphery which are aligned with supports 20, 21, 22 and 23, which are bored to receive counter-weight shafts which threadedly engage counterweights for bringing the platform assembly into a condition of neutral equilibrium about point 31 (FIGURE 4). In FIGURE 3 boss 67 receives shaft 70, which is secured therein by a pin 71: shaft 70 carries large and small counterweights 72 and 73, respectively, and passes through a suitable hole in flange 65, where it is retained by nuts 74 and washers 75.

Base assembly 12 is shown in FIGURES 1 and 4 to comprise a floor flange 76 which receives a vertical column 77, to which it is secured by clamp screws 80. A bracket 81 makes a sliding fit with column 77 at its top, and comprises a rim 82 carried on a plurality of diverging ribs 83. A support ring 84 is secured to ring 82 by screws 85, after having been very accurately adjusted to be concentric with the axis of column 77 by the use of centering screws 86, having lock nuts 87, and threaded into lugs 90 projecting from rim 82.

A cap 91 is secured to the top of column 77 by set screws 92 and comprises a lower portion or plug 93 and an upper portion 94 which is defined as a pad because it functions as the lower portion of a gas bearing. Plug 93 and cap 94 are secured together in air tight relation by screws 95, and define a pressure manifold 96 to which pressure fluid may obtain access through a passage 97 in plug 93. As is shown in FIGURE 7, pad 94 is pierced by a plurality of apertures 100, arranged in circles. The apertures are spaced mutually by 18°, and those in the inner circle are offset by 9° from those in the outer circle. The inner circle subtends an angle of 30° at the center of the sphere, and the outer circle subtends an angle of 70°.

FIG. 4 shows that a hollow spherical support member 101 is secured to the under surface of platform 13, by screws 102 or other suitable means, and a second spherical member 103 is secured within member 101 by screws 104 and carries an upwardly extending threaded shaft 105. The outer surfaces of members 101 and 103 are concentric at point 31, within a few ten-thousandths of an inch, and pad 94 has very accurately the same radius as member 103: the center of the surface of pad 94 is very accurately on the axis of column 11. Moreover the sphericities of members 94 and 103 are 50 and 10 microinches, respectively.

Bracket 81 is normally adjusted vertically of column 11, by means presently to be described, so that when ring 84 engages member 101 to support the platform assembly, there is a distance of approximately .1 inch between the center of member 103 and the center of pad 94. Shaft 105 is used in assembling the device: it is locked to platform 13 by a jam nut 106, and an eye may be temporarily threaded on shaft 105 and secured by further jam nuts 107, which also function as fine counterweights. The platform assembly may then be lifted by a suitable hoist and lowered onto the base assembly, being carefully guided until member 101 engages ring 84 so that the position shown in FIGURE 4 is reached. Note that during this procedure there is little opportunity of damaging the fine surface of pad 94, and none of damaging sphere 103.

The diameter of sphere 101 is 17 inches and the mass of the platform assembly, even without inertial weights, is over 1600 pounds, so friction between the sphere and the ring 84 holds the platform immovable. When it is desired to use the simulator, pressure fluid in the form of dry nitrogen gas is supplied to manifold 96, as will be described, and the gas passes through orifices 100 and becomes a gas bearing for the surface of the platform. Bracket 81 may now be lowered so that ring 84 moves out of contact with sphere 101, and the platform is free to rotate about point 31 in any direction.

Vertical movement of bracket 81 is accomplished by a motor 110 which acts through reduction gearing 111 to drive the lower member of a dog clutch 112. The upper member of clutch 112 is carried on a shaft 113 journaled in a boss 114 in floor flange 76 and carrying a pinion 115 which meshes with a ring gear 116 shrunk or otherwise secured on the end of a nut 117. A screw 120 is secured against rotation with respect to column 77 by a key 121, and bracket 81 rests on a dust cover 128 which in turn rests on screw 120, and which may include a sealing ring 129. The lower end of nut 117 rests on a thrust bearing 122 carried on flange 76. By this arrangement, the operation of motor 110 causes rotation of nut 117 to displace screw 120, and with it bracket 81 and ring 84, linearly along column 77.

As shown in FIGURES 4 and 6, normally closed limit switches 123 and 124 are mounted on flange 76. FIGURE 6 also shows that a pair of rings 125 and 126 are adjustably secured to the lower portion of nut 117 and ring gear 116 by screws 127. A pin 130 projects downwardly from ring 125 and a pin 131 projects downwardly from ring 126. The rings are so adjusted around the column that switch 123 is opened when ring 84 is .1 inch above the level at which members 103 and 94 would be in physical contact, and switch 124 is opened when ring 84 is .03 inch below that level. For this limited travel of bracket 81, considerably less than a single turn of nut 117 with respect to screw 120 is required, and in practice a ball screw may advantageously be substituted for the simple screw shown in FIGURE 6.

As mentioned previously, the surfaces of members 94 and 103 are finished to a few microinches, and any physical contact between these two members, even though of brief duration, would result in scars which would ruin the gas bearing. Accordingly, means are provided for preventing operation of motor 110 to lower ring 104 unless the gas bearing is adequately supplied with gas, and for automatically operating the motor to bring ring 104 into supporting operation if the gas pressure fails. Details of this circuitry are given in FIGURE 8, where a tank 132 of dry nitrogen gas at a pressure of 2,000 pounds per square inch energizes a line 133 through a pressure regulator 134: the pressure in line 133 is about 200 pounds per square inch. Line 133 is connected through a second regulator 135, a needle valve 136, a line 137 including a pressure switch 140, a surge tank 141, and a line 142 including a filter 143, to passage 97 leading to manifold 96 (FIGURE 4). Pressure switch 140 is normally closed, but is open when the pressure in line 137 is greater than about 40 pounds per square inch.

Motor 110 is shown at the right of FIGURE 8, and is energized from a source 144 of alternating voltage under the control of pressure switch 140, limit switches 123 and 124, and a manual switch 145 having Up, Off, and Down positions. The motor has a primary winding 146, a starting winding 147, and a centrifugal switch 150; when the motor is not running, switch 150 is closed and winding 147 is connected to a starting capacitor 151. The system also includes a relay 152, having a winding energizable to displace a movable contact 152a into engagement with a fixed contact 152c, a further relay 153, having a winding energizable to displace movable contacts 153a and 153d out of normal engagement with fixed contacts 153b and 153e and into engagement with fixed contacts 153c and 153f, all respectively, and a time delay relay 154 whose winding is effectively, after a delay interval, to displace a movable contact 154a into engagement with a fixed contact 154c. Switch 145 includes movable contacts 155a and 155e simultaneously actuated by a knob 155 to engage fixed contacts 155b and 155f, fixed contacts 155c and 155g, or fixed contacts 155d and 155h, all respectively.

In the standby condition of the apparatus, the weight of the platform assembly is resting on ring 104, which is in its Up position, and switch 123 is open. Switch 124 is closed, switch 145 is in its Off position, and the contacts of relays 152, 153 and 154 are as shown. To set the apparatus in operation, gas is released from cylinder 132, as by opening needle valve 136, and flows through line 142 to the manifold 96. As pressure builds up in the line, the manifold, and surge tank 141, it reaches the value at which switch 140 closes. Main switch 156 may now be closed completing a circuit from source 144 through conductor 157, switch 156, conductors 160, 161 and 162, switch 140, conductor 163, relay 153, and conductors 164, 165 and 166 back to source 144. Relay 153 is energized, and movable contacts 153a and 153d engage contacts 153c and 153f. Switch 145 may now be actuated into its Down position, when a circuit may be traced from source 144 through conductor 157, switch 156, conductors 160, 161 and 167, contacts 153a and 153c, conductor 170, contacts 155a and 155d, conductor 171, switch 124, conductors 172, 173 and 174, winding 146 of motor 110, conductors 175, 176 and 177, contacts 155h and 155e, conductor 180, contacts 153f and 153d, and conductors 181, 165 and 166 to source 144. The winding of relay 152 is connected in parallel with motor winding 146, so that the relay is energized whenever the motor winding is energized, and a circuit can then be traced from source 144 through conductor 157, switch 156, conductors 160, 182 and 183, contacts 152a and 152c, conductor 184, capacitor 151, conductor 185, centrifugal switch 150, conductor 186, starting winding 147, and conductors 187, 190 and 166 back to source 144. Motor 110 starts to run, closing switch 123 and lowering ring 104 so that the weight of the platform assembly is transferred to the gas bearing. After this has occurred switch 124 opens, deenergizing relay 152 and motor 110: the motor stops and switch 150 closes. Switch 145 may now be actuated to its Off position.

When it is desired to restore the apparatus to standby status, switch 145 is thrown to its Up position. A circuit may now be traced from source 144 through conductor 157, switch 156, conductors 160, 161 and 167, contacts 153a and 153c, conductor 170, contacts 155a and 155b, conductors 190 and 191, switch 123, conductors 192, 176 and 175, motor winding 146 (and relay winding 152), conductors 174, 173 and 193, contacts 155f and 155e, conductor 180, contacts 153f and 153d, and conductors 181, 165 and 166 to source 144. Relay 152 completes the circuit for winding 147 as previously described: since the windings are now energized in the opposite phase relation to that previously described, motor 110 runs in the opposite direction, closing switch 124 and raising ring 104 so that the weight of the platform assembly is transferred from the gas bearing to the ring. After this has occurred switch 123 opens, deenergizing relay 152 and motor 110: the motor stops and switch 150 closes. Switch 145 may now be actuated to its Off position.

The function of switch 140 will now be explained. If by inadvertence switch 156 is closed and switch 155 is thrown to its Down position before sufficient pressure exists in the gas bearing to prevent physical contact between its members, motor 110 and relay 152 cannot be energized because contacts 153a and 153c and contacts 153d and 153f are both open.

Now suppose that the platform is supported on its gas bearing, with switch 145 in either its Down or Off position, and with switch 123 closed and switch 124 open as described above. Now if by inadvertence valve 136 is closed, for example, the pressure in the gas bearing begins to drop. This takes place rather slowly, because of the storage capacity of tank 141, but presently switch 140 opens, deenergizing relay 153, and relay contacts 153a and 153b and relay contacts 153d and 153e engage. A circuit may now be traced from source 144 through conductor 157, switch 156, conductors 160, 161, and 167, contacts 153a and 153b, conductors 194 and 195, relay winding 154 and conductors 196, 164, 165 and 166 to source 144. Time delay relay 154 is energized, and after a few seconds of delay, contacts 154a and 154c engage. A circuit may now be traced from source 144 through conductor 157, switch 156, conductors 160, 161, 167, contacts 153a, 153b, conductors 194 and 197, contacts 154a and 154c, conductors 200 and 191, switch 123, conductors 192, 176 and 175, motor winding 146 (and relay 152) conductors 174, 173, 193 and 201, contacts 153e and 153d, and conductors 181, 165, and 166 to source 144. Motor 110 is thus energized to raise ring 104 and transfer the weight of the platform assembly from the gas bearing to the ring before damaging contact between the gas bearing members can take place.

The delay inserted by relay 154 is not of appreciable duration compared to the interval between the occurrence of gas failure and the occurrence of contact between the gas bearing components. The relay is needed, however, for the special case of failure of the gas supply while the motor is operating in the downward direction. Operation of relay 153 to reverse the phase of the energization of winding 146 would not in this case reverse the direction of movement of the support ring, since once the motor is up to speed it is operating single phase, and hence would continue to do so in the same direction, even though the phase of the energization of the single phase were suddenly reversed.

However, the temporary complete interruption of motor energization which takes place while relay 154 is delaying gives an interval during which the motor slows down to a point where switch 150 operates, and thereafter completion of the reverse circuit reverses motor operation as desired.

Another safety feature is disclosed in FIGURE 4. It is possible for electrical power failure to occur while the weight of the platform assembly is supported on the gas bearing. Means are therefore provided to raise ring 104 into supporting position manually, comprising a ring 202 fixed to shaft 133, by which the upper portion of clutch 112 may be lifted out of engagement with the lower portion of the clutch, thus disconnecting motor 117 from motor 110. An aperture 203 is provided in nut 117 to receive a capstan bar or spanner by which the nut may be manually rotated through the portion of a turn necessary to accomplish the transfer of weight from the gas bearing to the support ring. Ring 202 and clutch 112 may be replaced by an electrically engageable clutch if desired.

To facilitate monitoring the operation of the gas bearing it is desirable to have a measure of the spacing between the two members of the bearing, since obviously a gas pressure sufficient to maintain adequate separation for a platform weight of 1600 pounds might not be sufficient when the weight is increased to 4000 pounds. To this end a plurality of capacitor probes 204, 205, 206 and 207 are inserted in pad 94 and insulated therefrom, so that the capacitance measured between any one of them and the frame is a measure of the distance between the probe and spherical member 103. As suggested in FIGURE 9, any probe may be made part of a capacitance bridge 210 so that a detector connected to the bridge may be calibrated in units of linear displacement between elements 94 and 103. More complex circuitry may be used if it is desired to monitor from more than one probe at a time.

The delicacy of the apparatus just described is extremely great, due to the very low friction offered by the gas bearing. It was found by experience, for example, that a single fly lighting on the edge of the platform is sufficient to cause reaction of the latter even though it may be carrying inertia weights to a total of 4000 pounds. Obviously the inertial balancing of such a device is a protracted matter of trial and error. At first, counterweights 72, 73 are placed at the bottom of shaft 70 so the platform assembly is assuredly in stable equilibrium. Then the platform assembly is placed on the base assembly, the gas bearing is supplied with gas, and ring 104 is slightly lowered, the tendency of the table to tilt is noted, the ring is raised to support the platform assembly, and inertia weights are added and adjusted in a direction to reduce the tilt. By a repetition of these processes a condition is reached in which the unbalance of the table is small enough that it can be allowed to rest on its air bearing for appreciable intervals. It is next necessary to raise counterweights 72, 73 so that the platform assembly comes closer and closer to a condition of neutral equilibrium, and as this occurs, the static balance of the table must be perfected as well.

To avoid the necessity of operating motor 110 up and down many times in the course of these final balancing procedures, the central portion of pad 94 is provided with a downwardly extending boss 208 sealed into a bore 209 in member 93 by an O-ring 210 and bored at 211 to receive a brake assembly 212 shown in more detail in FIGURE 5. Brake assembly 212 comprises a plug 213 sealed in pressure tight relation to bore 211 by an O-ring 214 and fastened to pad 94 by screws 215. Slidable in bore 211 above plug 213 is a piston 216 having a piston shaft 217 secured to the head thereof and extending through an opening in plug 213 as a loose sliding fit. A pair of jam nuts 218 are carried on the lower end of shaft 216 to limit the upward movement of the piston. A sealing bellows 220 is provided between plug 213 and piston 216, the head of which is recessed to recevie a pad 221 of urethane rubber. The chamber 222 under bellows 220 is connected by a port 223 with bore 209, and a suitable connecting passage 225 (FIGURE 4) is provided for admitting gas under pressure to bore 209 so as to lift pad 221 into frictional engagement with member 203.

Turning again to FIGURE 8, the nitrogen from regulator 134 is further connected through a line 226 to a normally closed electrically operable value 227 having a solenoid 230, and from the valve through line 231 to passage 225 of FIGURE 4. In its deenergized condition, valve 227 completes a passage between line 231 and a bleed line 232 having a manually operable bleed valve 233. Solenoid 230 may be energized by closing a switch 234, whereupon a circuit may be traced from source 144 through conductor 157, switch 156, conductors 160, 182 and 235, switch 234, conductor 236, solenoid 230, and conductors 237, 190 and 166 back to source 144. When the solenoid is energized, the valve completes a passage from line 226 to line 231, and disconnects line 232.

In theory, brake 212 applies its force through pad 221 to member 103 along a line passing through point 31, and hence has no perturbing effect on the platform. In practice it has been found that some perturbations do occur when simple solenoid valve control of the piston is exerted, due probably to the fact that pad 221 by its very resilience is capable of some distortion. The perturbations are not particularly troublesome during the initial balancing of the platform, either bare or with control components on it, but becomes more serious during fine balancing and also during test procedures. The difficulty has been overcome, in release of the brake, by providing bleed valve 233 which may be partially closed to slow down the brake releasing movement and hence to reduce the forces transmitted to the plaform. In brake application the difficulties have been overcome by adding a line 241, including a further, normally closed regulator 242, extending between lines 226 and 232: valve 227 is now left in its deenergized condition, the brake being applied by opening regulator 242 slowly with valve 233 closed. Brake release now requires closing regulator 242 and opening valve 233. By this arrangement extremely gentle brake engagement and release is possible.

Thus far there has been described a platform which has a mass moment of inertia comparable to that of a small space vehicle, that is, up to 750 slug feet squared about the normally vertical axis and up to 450 slug feet squared about the normally horizontal axes, and yet is almost perfectly balanced and free from surface friction. The importance of the particular platform structure will now be apparent. In use the various gyroscopes and other components of an attitude control system are secured to plate 15, or to a mounting disc secured thereto, and the platform may be tilted up to 30° with respect to the horizontal in any direction, with more than a ton of inertial weights added at its edges. Unless the platform is almost perfectly rigid, it flexes when its angular position changes, and the responses of the system sensors resulting therefrom cause improper operation of the control system. The aluminum honeycomb has been found to give the most rigid structure possible for a given mass, far exceeding ribbed castings, weldments, and so forth.

It is necessary that means be provided for causing motion of the platform about each of its axes under the control of the system being tested. To accomplish this, a plurality of high pressure gas bottles are mounted under the platform at symmetrical points around its circumference: one such bottle appears at 243, FIGURE 1. These bottles are all connected to a high pressure manifold 244 which encircles and is rigidly secured to member 63. A pressure regulator 245 is connected to manifold 244, and regulates the pressure in a second manifold 246. Six pairs of oppositely directed nozzles are provided, four pairs acting normally to the platform surface and two pairs acting parallel to the platform surface. Thus in FIGURE 1 a pair 247 of nozzles 250 and 251 are mounted so that their axis intersects perpendicularly the axis of carrier 20. Nozzles 250 and 251 are connected through solenoid valves 252 and 253 and a line 254 to manifold 246. A second pair 255 of nozzles are mounted on the platform so that their axis intersects that of carrier 22. The upper solenoid of pair 247 and the lower solenoid of pair 255 are intended to be pulsed simultaneously by the control apparatus to be tested, to cause jets of gas which provide a couple of force tending to rotate the platform about the axis of holders 21 and 23 in a direction to lower carrier 20, while if the lower solenoid of pair 247 and the upper solenoid of pair 255 are pulsed simultaneously, the resulting jets cause the platform to rotate in the opposite direction about the same axis. Similar pairs of nozzles are provided to cause rotation of the platform in either direction about the axes of holders 21 and 23.

Rotation of the table about its normally vertical axis may also be accomplished by further pairs 256 and 257 of nozzles mounted under the platform and acting perpendicular to the axes of holders 21 and 23 and in the plane defined by these and holders 20 and 22. As is best shown in FIGURE 2, pair 256 includes nozzles 260 and 261, connected to manifold 246 through solenoid valves 262 and 263 respectively and a suitable line. In FIGURE 1 one nozzle 264 and one solenoid valve 265 of pair 257 are shown, together with the line 266 connected to manifold 246. Normally all solenoid valves are tightly closed.

It will be appreciated that by providing the system of circular manifolds no change in the static balance of the platform assembly occurs as the weight of the compressed gas in the bottles is decreased by discharge of the gas to the nozzles.

When a system to be tested has been secured to the platform and electrically connected to the solenoid valves the entire assembly is brought to a condition of neutral equilibrium and is balanced as nearly as possible. It has been found that the gas bearing applies to the platform a small but significant "turbine torque" about the normally vertical axis of the platform, and that it is hardly possible to completely balance the platform statically. Accordingly when the brake is released, the platform begins to tilt very slowly, and to rotate very slowly about the normally vertical axis. The system sensors respond to these movements, or to their rates, or to both, according as the system is designed, and solenoid operation results to return the platform to its initial position. From a study of the plot of platform attitude against time it is possible to evaluate the control system on the platform.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principle of the invention, to the full extent indicated by the broad general meaning of the terms in which the appended claims are expressed.

I claim as my invention:

1. In a simulator, in combination: an instrument platform comprising a sheet of honeycomb material bonded to upper and lower end plates and to a peripheral side plate, the thickness of the sheet being large compared to the transverse extent of the cell of the honeycomb but small compared to the other dimensions of the sheet, and the cells extending in the direction of the thickness of the sheet, so that the platform has very great rigidity compared to its weight; ball and socket means, including an air bearing, supporting said platform for free rotation about a first, normally vertical axis, and for limited rotation about each of two further, mutually perpendicular axes normally perpendicular to said normally vertical axis; adjustable weight holding means lying along said further axes for receiving incremental weights to augment the moment of inertia of said platform and to put said platform in static balance; further means including a hollow cylindrical counterweight fixed to and supported by said platform and surrounding said ball and socket means and having weights movable in a direction parallel to said first axis, for establishing said platform in a condition of neutral equilibrium regardless of its attitude about its three axes; and means including a source of pressure fluid, a plurality of reaction jets acting severally about said three axes, and controllable valve means for releasing said pressure fluid through said jets to apply reaction forces to said platform acting about said three axes.

2. In a simulator, in combination: an instrument platform comprising a sheet of honeycomb material bonded to upper and lower end plates and to a peripheral side plate, the thickness of the sheet being large compared to the transverse extent of a cell of the honeycomb, but small compared to the other dimensions of the sheet, and the cells extending in the direction of the thickness of the sheet, so that the platform has very great rigidity compared to its weight; ball and socket means, including an air bearing, supporting said platform for rotation about 360° about a first, normally vertical axis and for limited rotation about each of two further, mutually perpendicular axes, normally perpendicular to said normally vertical axis; adjustable means for putting said platform in static balance; further means including a hollow cylindrical counterweight fixed to and supported by said platform and surrounding said ball and socket means and having weights movable in a direction parallel to said first axis for establishing said platform in a condition of neutral equilibrium regardless of its attitude about its three axes; and means, including a source of pressure fluid, a plurality of reaction jets acting severally about said three axes, and controllable valve means for releasing said pressure fluid through said jets, for applying reaction forces to said platform about said three axes.

3. A simulator comprising, in combination: platform means having a pair of normally horizontal axes and a normally vertical axis, the axes being mutually perpendicular and intersecting at a common point, said platform means including a platform, an inner spherical support member, a hollow outer spherical support member concentric therewith at said common point, reaction jet means mounted to act in mutually perpendicular planes containing said axes, whereby to cause rotation of said platform means about said point, and means adjustable to establish a condition of neutral equilibrium about said common point for said platform means in the absence of operation of said reaction jet means; and base means including a column carrying a concave spherical pad, for coacting with said inner spherical member to comprise a fluid bearing, a source of pressure fluid for said bearing, bracket means movable axially of said column, a platform support ring carried by said bracket means for normally engaging said hollow spherical member to hold said inner spherical member out of contact with said pad, and means for causing said bracket means to move downwardly and upwardly along said column to transfer the weight of said platform means between said support ring and said fluid bearing.

4. In combination: platform means including a platform, an inner spherical support member, and a hollow outer spherical support member concentric therewith; and base means including a column carrying a concave spherical pad, for coacting with said inner spherical member to comprise a fluid bearing, a source of pressure fluid for said bearing, bracket means movable axially along said column; a platform support ring carried by said bracket means for normally engaging the spherical surface of said outer spherical member to position said platform means with said inner spherical member out of contact with said pad, and means for moving said bracket means downwardly and upwardly along said column, to transfer the weight of said platform means between said support ring and said fluid bearing.

5. In combination: platform means including a platform, an inner spherical support member, and a hollow outer spherical support member concentric therewith; base means including a column carrying a concave spherical pad, for coacting with said inner spherical member to comprise a fluid bearing, a source of pressure fluid for said bearing, bracket means movable axially along said column; a platform support ring carried by said bracket means for normally engaging said outer spherical member to position said platform means with said inner spherical member out of contact with said pad, and means for moving said bracket means downwardly and upwardly along said column, to transfer the weight of said platform means between said support ring and said fluid bearing; and means preventing downward movement of said bracket means unless said pressure fluid is being supplied to said fluid bearing.

6. In combination: platform means including a platform, an inner spherical support member, and a hollow outer spherical support member concentric therewith; base means including a column carrying a concave spherical pad, for coacting with said inner spherical member to comprise a fluid bearing, a source of pressure fluid for said bearing, bracket means movable axially along said column; a platform support ring carried by said bracket means for normally engaging said outer spherical member to position said platform means with said inner spherical member out of contact with said pad, and means for moving said bracket means downwardly and upwardly along said column, to transfer the weight of said platform means between said support ring and said fluid bearing; and means effective if the supply of pressure fluid for said bearing fails to cause upward movement of said bracket means to prevent contact between said inner spherical member and said pad.

References Cited by the Examiner

UNITED STATES PATENTS 2,014,024   9/35   Leatherman _____ 33—224
3,092,918   6/63   Haeussermann et al. _____ 35—43

ISAAC LISANN, *Primary Examiner.*